No. 742,659. PATENTED OCT. 27, 1903.
J. L. HOWARD.
HAND PLANTER.
APPLICATION FILED OCT. 31, 1902.
NO MODEL. 2 SHEETS—SHEET 1.
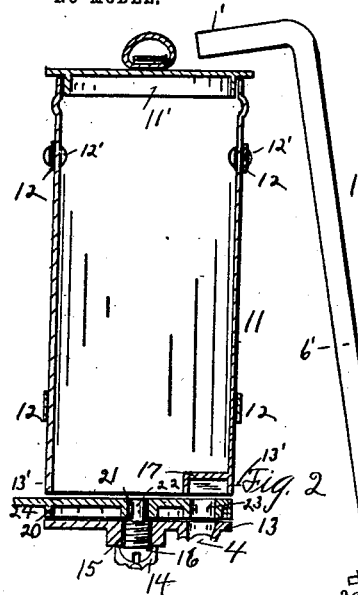
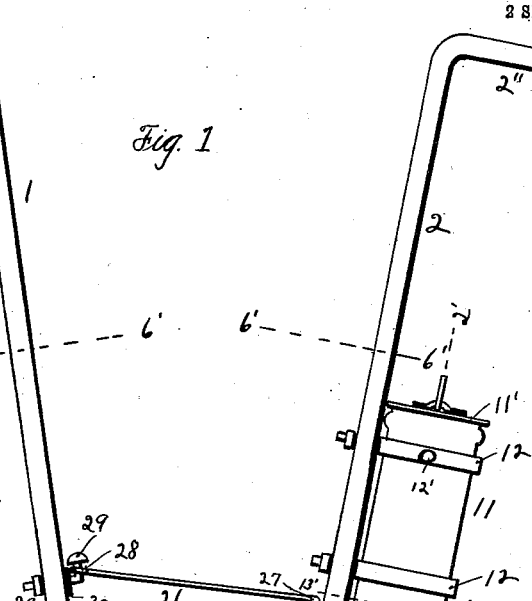
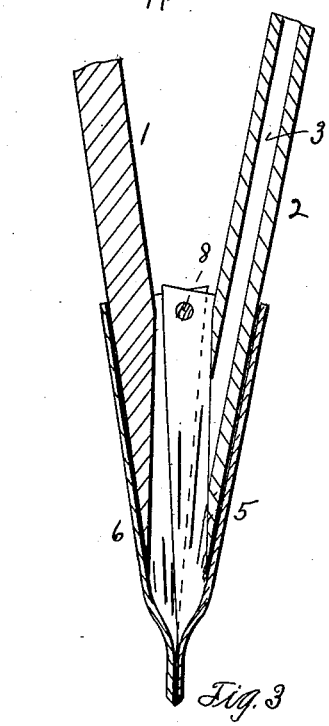
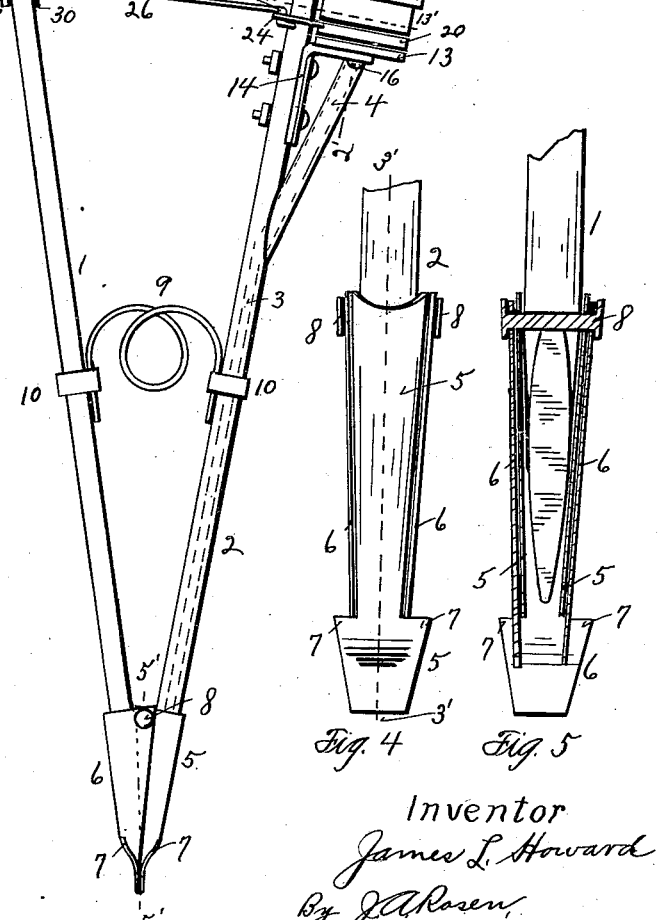
Witnesses
Inventor
James L. Howard No. 742,659. PATENTED OCT. 27, 1903.
J. L. HOWARD.
HAND PLANTER.
APPLICATION FILED OCT. 31, 1902.
NO MODEL. 2 SHEETS—SHEET 2.
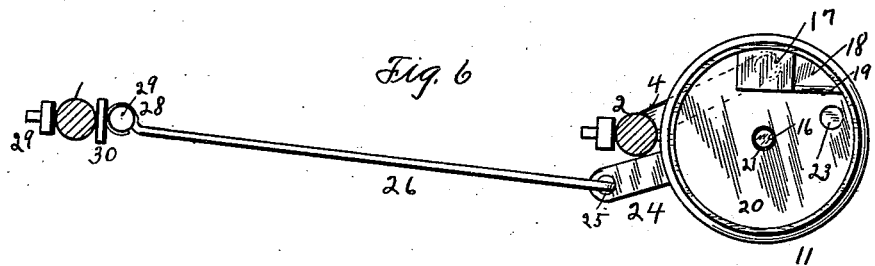
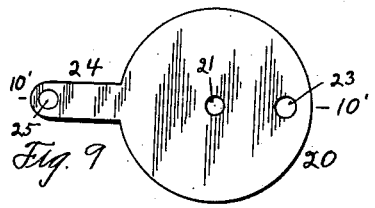
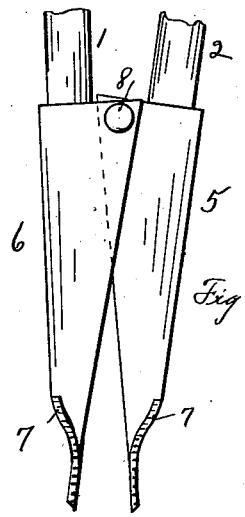
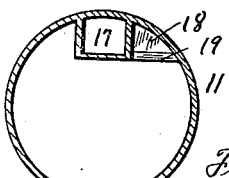
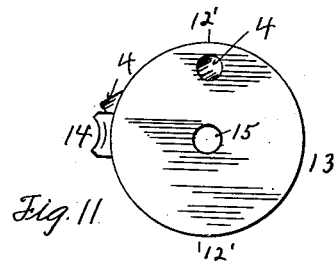
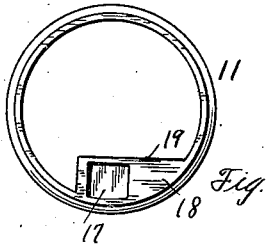
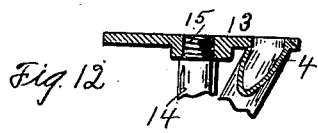
Witnesses
J. T. Fisher
G. J. Rosen
Inventor
James L. Howard
By J. A. Rosen,
His Atty.
THE NORRIS PETERS CO., PHOTO-LITHO., WASHINGTON, D. C.

No. 742,659.

Patented October 27, 1903.

UNITED STATES PATENT OFFICE.

JAMES L. HOWARD, OF TOPEKA, KANSAS.

HAND-PLANTER.

SPECIFICATION forming part of Letters Patent No. 742,659, dated October 27, 1903.

Application filed October 31, 1902. Serial No. 129,572. (No model.)

*To all whom it may concern:*

Be it known that I, JAMES L. HOWARD, a citizen of the United States of America, residing at Topeka, in the county of Shawnee and State of Kansas, have invented new and useful Improvements in Hand-Planters, of which the following is a specification.

The object of the invention is to provide a particular construction of hand-planters which is economic, which is easily operated, which may not readily get out of order, which may be quickly and simply adjusted to any kind of seed, and which may be easily thrust into the soil and certainly plant the seed in the hole made without risk of the seed dropping on the soil outside of the hole.

The invention consists of the novel combination, arrangement, and disposition of the parts as herein described and claimed, and as shown in the accompanying drawings, forming part of this specification.

Figure 1 is a side elevation of the hand-planter complete in position ready for being thrust into the soil. Fig. 2 is a vertical section through the line 2' 2', Fig. 7, of the hopper and feeding devices. Fig. 3 is a vertical section of the lower ends of the handles and points through the line 3' 3', Fig. 4. Fig. 4 is a side view of same. Fig. 5 is a vertical section of same through line 5' 5', Fig. 1. Fig. 6 is a plan view of the planter, the handles being shown in section through the line 6' 6', Fig. 1, and the lid to the hopper being removed. In this view the planter is in position ready to be thrust into the soil, the same as in Fig. 1, the handles being spread apart and the points being closed. Fig. 7 is a similar view of the planter when in the position which it assumes upon being thrust into the soil and the handles being brought together to open the points 5 and 6, as shown in Fig. 8, and the disk 20 being oscillated in order to effect the feeding. Fig. 8 is a side view of the lower extremities of the handles, same as Fig. 1, but in the position of being opened, as when the handles are brought together, as shown in Fig. 7. Fig. 9 is a top view of the oscillating disk which forms the bottom of the hopper. Fig. 10 is a section of same through line 10' 10', Fig. 9. Fig. 11 is a top view of the support therefor. Fig. 12 is a section of same through the line 12' 12', Fig. 11. Fig. 13 is a section of the hopper through the line 13' 13', Figs. 1 and 2. Fig. 14 is a bottom view of the hopper, and Fig. 15 is an end view of the screw 16.

Like numerals refer to like parts throughout the several views.

The invention consists of the two handles 1 and 2, the latter of which is hollow from its lower end 3 up to the spout 4. The lower ends of the handles are attached to the metallic points 5 and 6, each of which is provided with the arrow-head-shaped tips 7 7. The handles are pivoted together by the bolt or rod 8, which passes through the upper portions of the hollow points 5 6, which overlap in order to make a tight closure. The handles are normally kept spread apart by the spring 9, which is fastened to the handles by the bands 10 10.

11 is the hopper, which is attached or bolted to the hollow handle 2 by means of the bands 12 12. The hopper should be riveted to at least one of said bands, as shown at 12', in order to hold it firmly in position. 13 is a supporting-plate bolted to the same handle by the bracket 14. This supporting-plate is preferably of circular form of diameter similar to that of the hopper 11 and at the center has the threaded hole 15 to take in the threaded portion of the screw 16. The spout 4 has its upper opening in said plate 13 at a point immediately under a bottomless box 17, located in the lower portion of the hopper 11. The plate 18 has its bottom flush with the lower edge of the sides of the hopper 11. The lower edges of the box 17 are also flush with the lower edges of the sides of the hopper 11. The box or cut-off 17 and plate 18 are integral with the side of the hopper. The edge of the plate 18 may be sharpened, as shown at 19, and the box and plate, together with the oscillating disk 20, form the bottom to the hopper. The disk 20 is of a diameter similar to that of the hopper 11 and has at its center the unthreaded hole 21, which works on the unthreaded portion 22 of the screw 16. The disk 20 oscillates about the unthreaded portion 22 of said screw. At one side of the disk 20 is the hole 23, which is located so as to register with the box 17 and spout or tube 4, which latter register with each other—that is to say, the hole 23 registers with the box 17 and upper opening of the spout 4 when in the position shown in Fig. 7 when the handles are brought together; but when the said disk is turned around, as shown in Fig. 6, said hole 23 is brought out from under said box and said plate 18. The disk 20 has a handle 24, which has a hole therein 25, in which is inserted the end of the rod 26. The end 27 of said rod 26 has a double bend, as shown, in order to keep it from slipping out. The other end is provided with an eye 28, which is attached to the bolt 29 in the other handle 1. A washer 30 is provided to prevent the rod 26 from wearing into the handle 1.

Normally the planter is in the position shown in Figs. 1, 3, and 6. It will be seen that in this position the points 5 6 are closed and that the hole 23 is out from under the plate and box 17 and 18. The hopper 11 is filled with seed. The lid 11' is placed thereon to prevent the same from being thrown out. This lid is removed in Figs. 6, 7, 13, 14. One or two of the seeds fall into the hole 23 and are retained therein by the supporting-plate 13. Now the operator takes hold of the handles 1' and 2" and thrusts the points 5 6 into the soil. The arrow-head-shaped tips 7 7 serve to effect the entrance into the soil with less resistance than if said points came straight down, and as they extend out to the slides beyond the points 5 6 they cut the soil, and in this way prevent the soil from being forced inside of the hollow points between the places where they overlap, and they also prevent in a similar way the breaking and bending of said points. They also serve at the same time to loosen up the soil around the seed. When the planter-points have been thrust into the soil to a sufficient depth, the handles are closed together, as shown in Fig. 7. The rod 26 pushes the handle 24 around, which oscillates the disk 20, so as to bring the hole 23 under the box 17 and over the upper opening of the spout or tube 4. Of course the disk 20 is of sufficient thickness at the hole 23 to permit one or two seeds in said hole. As the disk oscillates from the position shown in Fig. 6 to that shown in Fig. 7 the hole 23 passes under the plate 18, which cuts out or separates the bulk of the seeds in the hopper from the hole 23, and as the hole 23 comes over the spout 4 the seeds which are carried around in said hole will drop by the force of gravity through said spout or tube 4 and the hollow portion 3 of the handle 2 into the bottom of the hole in the soil made by the points 5 6, which when the handles are brought together will be separated, as shown in Fig. 8. The planter is then withdrawn from the soil, and the spring 9 forces the handles apart and the points together, when the disk 20 again assumes its normal position, (shown in Fig. 6,) in which position the hole 23 will be filled with as many seeds as it will accommodate. Of course the disk 20 fits snugly between the lower edges of the sides of the hopper 11 and box 17 and the under side of the plate 18 on the upper side and the top of the supporting-bracket 13 on the under side. Several disks may be provided with holes 23 of various sizes to be used with different sizes of seeds. To make a change, it would be necessary to remove the screw 16 and slip out the disk 20 and slip it off of the rod 26 and then insert the new disk. By means of the disk 20, covering almost the entire bottom of the hopper, it keeps the seeds moving, so that none of them will stick therein, but will all find their way to the hole 23 as said disk oscillates back and forth. By elevating that portion of the cut-off which is immediately over the upper opening of the spout 4, so as to form a box 17, the seed is prevented from adhering to the plate 18, as it might be apt to do when the seed or the machinery is moist. This box leaves the seed perfectly free to drop.

Having thus described the invention, what I claim as new, and desire to secure by Letters Patent, is—

1. A hand-planter consisting of the combination of the two handles pivoted together and provided with the spring 9 to spread them normally apart, and having the hollow points 5, 6, which have the arrow-head-shaped tips 7, 7 whose lobes extend beyond the sides of the points 5, 6 and are adapted to cut the earth for the passage of said points; one of the handles being hollow; the hopper 11 mounted on the hollow handle having the cut-off plate 18 and box 17 at the lower end thereof; the supporting-plate 13 mounted on the hollow handle having an opening registering with the box 17; the spout 4 affording passage from the opening to the hollow handle; the disk 20 pivotally and removably mounted on the supporting-plate by the screw 16 and fitting snugly but movably between the hopper and the supporting-plate, and having a pocket registering with the box 17 and the opening in the supporting-plate, and having a handle; and the rod 26 pivoted at one end to the other handle of the planter and removably attached at the other end to the handle of the disk 20, whereby the disk 20 may be oscillated by the opening and closing of the handles.

2. In a hand-planter, the combination of the handle; the hopper mounted thereon; the supporting-plate therefor; the disk 20; the cut-off in the hopper, the pocket in the disk, and the opening in the supporting-plate, registering with each other; the disk 20 being pivotally and removably mounted on the supporting-plate by the screw 16, and having devices whereby it may be oscillated to bring it out of and into register with said cut-off and said opening in the supporting-plate.

In testimony whereof I have hereto affixed my signature in presence of two witnesses.

JAMES L. HOWARD.

Witnesses:
 JOSEPH GROLL,
 E. DICE.